Sept. 21, 1971    T. W. EUBANKS    3,606,744
ADJUSTABLE TOWING HITCH
Filed Aug. 29, 1969
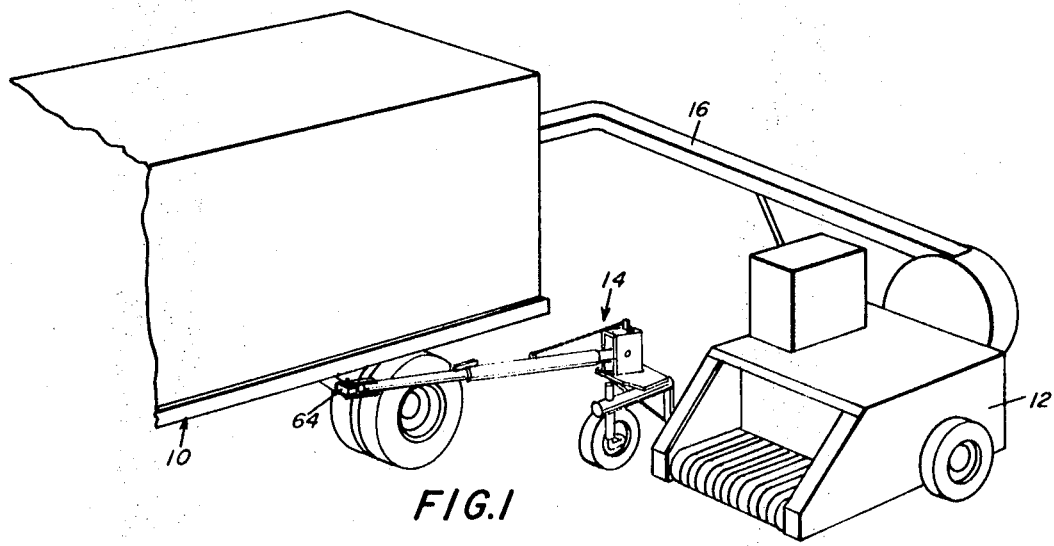
FIG.1
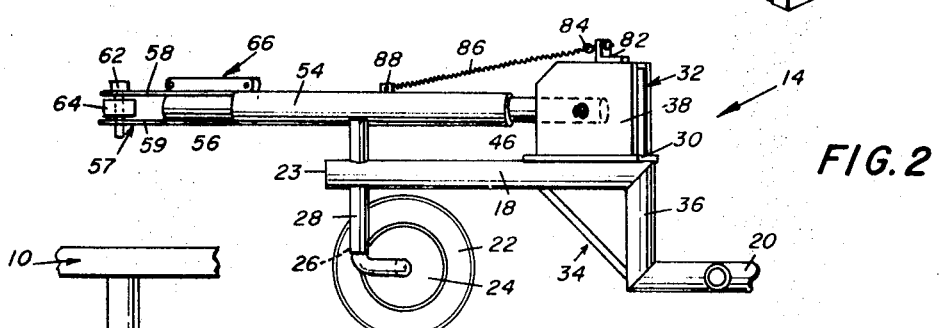
FIG.2
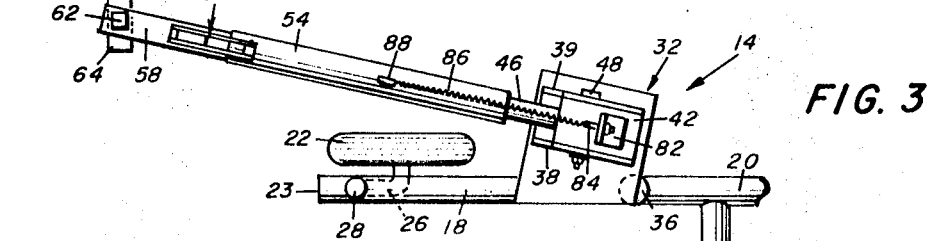
FIG.3
FIG.4
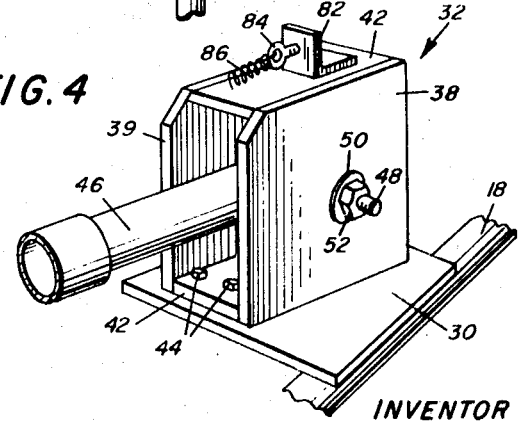
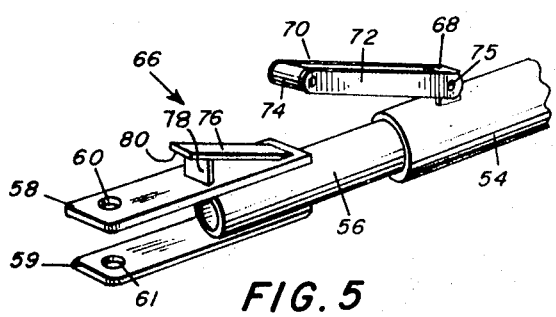
FIG.5
INVENTOR
TERRY W. EUBANKS
ATTORNEYS 3,606,744
ADJUSTABLE TOWING HITCH
Terry W. Eubanks, Ashland, Kans., assignor of fractional part interest to Robert M. Baker, Ashland, Kans.
Filed Aug. 29, 1969, Ser. No. 854,237
Int. Cl. B60d 1/16; A01d 43/06
U.S. Cl. 56—14.4
3 Claims

ABSTRACT OF THE DISCLOSURE

Subject invention relates to an adjustable towing hitch for use with a field or ensilage cutter. The hitch is secured to the frame of the field cutter by a connection bracket. A telescoping draw bar secured to the connection bracket extends forward to engage a bracket mounted on the side of a tow vehicle, a suitable locking mechanism being provided to prevent the draw bar from telescoping outwardly when the cutter is being towed. The connection bracket permits the draw bar to be pivoted in a vertical plane while giving it lateral stability, thereby permitting the cutter to be towed at a position to the side of the path of the towing vehicle. A swivel wheel is provided on the cutter frame to steer the cutter so that it will follow the tow vehicle.

BACKGROUND OF THE INVENTION

This invention relates, in general, to adjustable towing hitches and, more particularly, to an adjustable hitch for a feed or ensilage cutter which will permit the easy alignment and attachment of the cutter to a combined towing and collection vehicle.

Today the most commonly used commercially manufactured feed and ensilage cutters are pulled by a tractor with a power take-off to supply power to the cutter. A collection truck is also required to accompany the cutter, and the harvested feed or ensilage is conveyed into the truck through a delivery spout which is carried on the cutter. When the truck is fully loaded it proceeds to a storage silo or building for unloading while the cutter sits idle until the truck returns. As can be seen, this operation requires a tractor, at least one collection truck, and two drivers. On some of the smaller farms which are principally run by one person, this type of operation would necessitate the hiring of an additional operator to drive the truck or to get additional trucks so that the tractor driver's work time will not be wasted.

To eliminate the necessity of a two vehicle and two driver operation, it is necessary to provide a device which will allow the collection truck to tow the ensilage cutter. This is accomplished in the present invention by a unique hitch which utilizes a commercially manufactured cutter with a modified delivery spout and the installation of an engine on the cutter frame to eliminate the necessity of a power take-off from the towing vehicle.

Since it is difficult for one person to align and attach a heavy towed implement, it is also necessary that this unique hitch provide an easy means for aligning and attaching the implement to the towing vehicle. To accomplish this, the hitch is secured to the right side of the cutter frame so that the cutter can be pulled along the left side of the towing truck. In this configuration the driver of the towing truck can back up the truck into a position which will provide for easy alignment and attachment of the hitch with a bracket which is mounted on the side of the towing truck. The hitch has a draw bar with a telescoping feature which allows the driver to extend the draw bar forward so that the hitch can be easily attached to the truck bracket. The draw bar can be pivoted vertically which also aids in attachment. A locking mechanism is provided so that the draw bar will not telescope when the cutter is being towed.

SUMMARY OF THE INVENTION

It is, therefore, an object of this invention to provide a unique towing hitch which will eliminate the necessity of using two vehicles and two operators in the field cutting operation.

Another object of this invention is to provide an improved towing hitch which will allow a single operator to align and attach an ensilage cutter to a towing vehicle without assistance.

These and other objects are accomplished by the present invention through the use of a towing hitch secured to the frame to an ensilage cutter. The hitch includes a support arm which is secured to the cutter to provide support for a swivel wheel that is used for steering the cutter. The support arm also carries a connection bracket adapted to receive a telescoping draw bar provided with a clevis at one end for attachment to a truck-mounted bracket. The clevis is secured to an extension member of the draw bar which is inserted in and slidable within a sleeve so that the extension will telescope in and out to promote alignment. A locking means is provided on the telescoping draw bar which will secure the extension member in the sleeve when the cutter is being pulled by the towing. The sleeve is pivotally secured to the connection bracket in a manner to give lateral stabilization to the draw bar while permitting the draw bar to be moved freely in a vertical direction. The connection bracket is also mounted so that the draw bar extends angularly away from the side of the ensilage cutter to permit the cutter to be pulled at a slight distance from the side of the towing truck.

BRIEF DESCRIPTION OF THE DRAWINGS

The foregoing and additional objects, features and advantages of the invention will be apparent to those skilled in the art by the following detailed description of a preferred embodiment taken with the accompanying drawings, in which:

FIG. 1 is a perspective of a truck connected to an ensilage cutter by the hitch of the present invention and showing the cutter in the towed position;

FIG. 2 is a side view of the hitch of the present invention with the draw bar locked in a towing position;

FIG. 3 is a top view of the subject invention showing the angular mounting of the hitch with respect to the cutter frame;

FIG. 4 is a detailed perspective view of the connection bracket; and

FIG. 5 is a detailed perspective view of the draw bar locking mechanism.

DESCRIPTION OF THE PREFERRED EMBODIMENT

Referring more particularly to the drawings, in FIG. 1 the numeral 10 generally indicates a towing truck and numeral 12 generally indicates an ensilage cutter which is secured to the truck 10 by the improved hitch 14 of the present invention. A delivery spout 16 is provided to convey the feed or ensilage from the cutter into the truck.

Considering the hitch of the invention in greater detail, in FIGS. 2 and 3, there is illustrated at 18 a horizontal support arm which is rigidly secured, as by welding, to a cutter frame 20. The horizontal support arm 18 is parallel to the frame of the cutter and supports a swivel wheel 22. The swivel wheel is mounted at the forward end 23 of the support arm and provides a means for steering the cutter as it is pulled by the towing vehicle. The wheel hub 24 is secured to a swivel joint 26 which, in turn, is connected to vertical brace 28 attached to support arm 18. It will be noted that the brace 28 is forward of the axle of wheel 22 so that the swivel joint causes the wheel to follow the movement of support arm 18. Thus the wheel steers the cutter in the path defined by the support arm 18 and the hitch elements to be described, whereby the cutter is caused to follow the towing vehicle.

A base plate 30 is welded to the top of the support arm 18 and provides a platform to secure a connection bracket 32, which forms part of the subject hitch. A diagonal brace 34 connecting the horizontal support arm 18 to the cutter frame 20, extends from an upright 36 to the outside edge of the base plate 30, thereby giving it rigidity. The connection bracket 32, as shown in FIG. 4, is made up of two spaced, parallel side plates 38 and 39, a bottom plate 40 and a top plate 42 arranged to form a housing. The bottom plate of the connection bracket rests on the base plate 30 and is rigidly secured thereto by a plurality of fasteners 44 such as nut and bolt assemblies. The connection bracket is carried on the base plate at an angle of between 5° and 15° with respect to the side of the cutter.

A stud pipe 46 is secured in the connection bracket 32 by means of a bolt 48 which extends transversely through the side plate 39, through the stud pipe 46, and through the side plate 38, where it is secured by a washer 50 and nut 52. The bolt provides a pivotal mounting for the stud pipe within the connection bracket which permits vertical movement of the stud pipe but no lateral movement. A sleeve 54 is welded or otherwise fastened to the end of the stud pipe 46 extending out of the bracket, forming an extension of the stud pipe in a direction away from the cutter (see FIGS. 2 and 3).

An extension pipe 56 is carried in the sleeve to form a telescoping draw bar by means of which the cutter may be towed. To connect the draw bar to the towing vehicle, the extension pipe 56 is provided with a clevis at one end. The clevis is made up of an upper plate 58 and a spaced lower plate 59 connected to the upper and lower surfaces of the extension 56 and forming a generally U-shaped connector adapted to receive a suitable towing bracket connected to the towing vehicle. As shown, the connection to the towing bracket may be effected by a vertical pin 62 passing through hole 60 in the upper plate 58, through a corresponding aperture in truck mounted bracket 64, and then through a hole 61 in the lower plate 59 thereby attaching the cutter to the towing truck.

The extension pipe 56 may be moved in and out of the sleeve 54 in a telescoping fashion to allow the clevis to be mated with the truck-mounted bracket more easily. After the clevis 57 is mated with the truck bracket 64, the truck is moved to the rear so that the extension pipe 56 is telescoped inwardly into the sleeve to permit a locking mechanism 66 to secure the extension pipe 56 within the sleeve 54.

The locking mechanism 66, shown in FIG. 5 includes a bracket 68 secured to the top of the draw bar sleeve 54. A U-shaped latching member is formed of two links 70 and 72 for the sides, with a cylindrical roller 74 closing the end. This latching member is carried by the bracket 68 and is pivotally mounted thereto by means of a bolt 75. A ramp 76 on the extension member 56 is secured at one end to the upper plate 58 of the clevis and near the other end to a wedge plate 78, which is also attached to plate 58. The ramp 76 extends over the wedge plate so that it provides a lip 80 that will hold the roller 74 of the latching member in place when the cutter is being towed. To operate the locking mechanism, the truck is backed up so that the extension pipe 56 telescopes into the sleeve 54 and the roller 74 rides up the ramp 76 and over the lip 80, and falls in front of the wedge plate 78, at the same time resting on plate 58. As the truck 10 begins to move forward with the cutter, the roller 74 is prevented by wedge 78 and lip 80 from passing back over the ramp, thus preventing the pipe 56 from telescoping outwardly.

Another feature which is provided to enhance alignment and attachment consists of a balance spring which holds the draw bar in a generally horizontal position when the bar is not connected to the towing vehicle. An angle bracket 82 is secured to the top plate 42 of the connection bracket 32 for receiving a connecting eye 84. Balancing spring 86 extends between the connecting eye and a connection plate 88 (FIG. 2) secured to the top of the sleeve 54. This spring arrangement holds the draw bar in approximately a horizontal position for ease in manipulation of the draw bar when attaching the hitch to the towing truck.

The telescoping draw bar provides an easy means for aligning and attaching the cutter to the truck so that only one operator is needed. In operating the cutter with this modified hitch, the truck driver merely backs his truck into an approximate position beside and slightly ahead of the cutter and attaches the draw bar to the truck bracket by means of a heavy steel pin. The cutter motor is started and the driver moves the truck rearward until the locking mechanism latches the draw bar and then proceeds forward, pulling the cutter through the field to be harvested. The cut feed is then blown from the cutter through the modified spout into the towing truck. When a load has been gathered the operator shuts off the engine mounted on the cutter, disengages the hitch and drives the truck away for unloading.

It can be seen from the above description and drawings that this improved adjustable hitch provides a means to completely eliminate the need for an extra tractor and driver, as is now necessary when using the hitching mechanism of present ensilage cutters. Also, the telescoping draw bar which is pivotally mounted for vertical movement permits the single operator to align and attach the cutter to a tow truck with relative ease.

This preferred embodiment can be modified in various ways, such as by providing a square telescoping draw bar rather than a circular one; however, this type of variation can be made to the subject invention without departing from the true spirit of the invention as defined in the following claims.

I claim:

1. An adjustable hitch for connecting an implement to a towing vehicle comprising, in combination:
   (a) support means secured to said implement;
   (b) connection bracket means carried on said support means including a base plate, two side plates and a fastener extending through said side plates, said base plate and side plates being angularly connected to said support means, said angular position of said base plate and side plates permitting said implement to be towed at an angle to the direction of movement of said towing vehicle;
   (c) telescoping draw bar means for alignment and attachment of said implement to said vehicle, said draw bar means including a sleeve pivotally secured between said side plates of said connecting bracket by said fastener means, whereby said draw bar means is laterally secured to said connection bracket means while being permitted to pivot in a vertical plane, an extension member carried in said sleeve, a clevis secured to the end of said extension member and a latching means secured to said extension member external of said sleeve while said implement is being towed, said latching means comprising a latch member secured to said sleeve and a ramp secured to said extension member, both said latching member and said ramp being located so that said latching member will pass over said ramp and engage it when said extension member is inserted into said sleeve; and
   (d) a swivel wheel carried by said support means for steering said implement.

2. The adjustable hitch of claim 1 further including balancing spring means for holding said draw bar means approximately horizontal when said hitch is not connected to said towing vehicle.

3. The adjustable hitch of claim 2, wherein said implement is an ensilage cutter and said vehicle is a truck for receiving harvested ensilage.

References Cited

UNITED STATES PATENTS

| 406,276 | 7/1889 | Hamilton | 280—482UX |
|---|---|---|---|
| 2,976,059 | 3/1961 | Van Der Lely et al. | 280—472X |
| 3,014,737 | 12/1961 | Class | 280—475X |
| 3,169,782 | 2/1965 | Columbus | 280—482X |
| 3,295,866 | 1/1967 | Standfuss | 280—489X |
| 2,635,890 | 4/1953 | Schwartz | 280—508 |

FOREIGN PATENTS

| 872,025 | 7/1961 | Great Britain | 280—473 |
|---|---|---|---|
| 948,762 | 8/1956 | Germany | 280—508 |

LEO FRIAGLIA, Primary Examiner

J. P. SILVERSTRIM, Assistant Examiner

U.S. Cl. X.R.

280—473, 476, 478, 489, 508